(12) United States Patent
Benjebbour et al.

(10) Patent No.: US 9,209,878 B2
(45) Date of Patent: Dec. 8, 2015

(54) CODEBOOK ADAPTATION METHOD, RADIO BASE STATION APPARATUS AND USER EQUIPMENT

(71) Applicant: NTT DOCOMO, INC., Tokyo (JP)

(72) Inventors: Anass Benjebbour, Tokyo (JP); Sean Ramprashad, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/398,984

(22) PCT Filed: Apr. 23, 2013

(86) PCT No.: PCT/JP2013/061939
§ 371 (c)(1),
(2) Date: Nov. 5, 2014

(87) PCT Pub. No.: WO2013/168555
PCT Pub. Date: Nov. 14, 2013

(65) Prior Publication Data
US 2015/0117561 A1    Apr. 30, 2015

(30) Foreign Application Priority Data

May 7, 2012    (JP) .................. 2012-106001

(51) Int. Cl.
*H04B 7/02* (2006.01)
*H04B 7/04* (2006.01)
(Continued)

(52) U.S. Cl.
CPC ............ *H04B 7/0482* (2013.01); *H04B 7/0413* (2013.01); *H04B 7/0473* (2013.01);
(Continued)

(58) Field of Classification Search
CPC ............ H04B 7/00; H04B 7/02; H04B 7/022; H04B 7/04; H04B 7/0404; H04B 7/026; H04B 7/028; H04B 7/0408; H04B 7/068; H04B 7/0689; H04B 7/08; H04B 7/0456; H04B 7/0478; H04B 7/0482
USPC ......... 375/259, 260, 267, 295, 299, 316, 346, 375/347, 349
See application file for complete search history.

(56) References Cited

U.S. PATENT DOCUMENTS 8,045,528 B2    10/2011    Lee et al.
8,111,662 B2    2/2012    Lee et al.
(Continued)

FOREIGN PATENT DOCUMENTS

JP    2011-517524 A    6/2011

OTHER PUBLICATIONS

International Search Report for corresponding International Application No. PCT/JP2013/061939, mailed May 28, 2013 (2 pages).
(Continued)

*Primary Examiner* — Siu Lee
(74) *Attorney, Agent, or Firm* — Osha Liang LLP

(57) ABSTRACT

A method and system for adapting the structure of a codebook for precoding, by changing parameters, in downlink MIMO transmission using a plurality of transmitting antennas, is disclosed. A codebook adaptation method to adapt a codebook for precoding applied to downlink MIMO transmission includes the steps of reporting the codebook size of the codebook, defined with a plurality of parameters pertaining to gain information and phase information, from one communication apparatus to another communication apparatus, and, at the other communication apparatus, adapting the structure of the codebook, based on the codebook size reported from the one communication apparatus.

9 Claims, 11 Drawing Sheets

(51) Int. Cl.
    *H04W 16/28*      (2009.01)
    *H04B 7/06*      (2006.01)
    *H04W 72/04*      (2009.01)
    *H04W 88/02*      (2009.01)
    *H04W 88/08*      (2009.01)

(52) U.S. Cl.
    CPC ............ *H04B 7/063* (2013.01); *H04B 7/0632* (2013.01); *H04B 7/0634* (2013.01); *H04B 7/0639* (2013.01); *H04W 16/28* (2013.01); *H04W 72/042* (2013.01); *H04W 88/02* (2013.01); *H04W 88/08* (2013.01)

(56) References Cited

U.S. PATENT DOCUMENTS

| | | |
|---|---|---|
| 8,472,536 B2 | 6/2013 | Lee et al. |
| 8,811,355 B2 | 8/2014 | Lee et al. |
| 8,891,656 B2 * | 11/2014 | Benjebbour et al. .......... 375/267 |
| 2012/0008613 A1 | 1/2012 | Lee et al. |
| 2012/0087425 A1 * | 4/2012 | Gomadam et al. ............ 375/260 |
| 2012/0177011 A1 * | 7/2012 | Xi et al. ......................... 370/335 |

OTHER PUBLICATIONS

NTT DOCOMO; "Further evaluations on DL MU-MIMO with increased feedback bits for single point transmission scenarios;" 3GPP TSG RAN WG1 Meeting #67, R1-114079; San Francisco, USA; Nov. 14-18, 2011 (10 pages).

NTT DOCOMO; "Structured codebook design for 8 to 12 bit PMI feedback for DL MU-MIMO enhancement;" 3GPP TSG RAN WG1 Meeting #67, R1-114080; San Francisco, USA; Nov. 14-18, 2011 (7 pages).

3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8);" Dec. 2008 (18 pages).

\* cited by examiner

EXAMPLES : BITS ALLOCATION OF THE 8 AND 12 BIT PMI CODEBOOKS.

| CODEBOOK SIZE B | $g_b$ #BITS FOR GAIN AND PERMUTATION | p1 #BITS FOR $\theta 1$ | p2 #BITS FOR $\theta 2$ | p3 #BITS FOR $\theta 3$ |
|---|---|---|---|---|
| 8 BITS (00) | 0 | 3 | 2 | 3 |
| 12 BITS (10) | 3 | 3 | 3 | 3 |
| 12 BITS (11) | 0 | 4 | 4 | 4 |
| 8 BITS (01) | 2 | 2 | 2 | 2 |

FIG.3

| CODEBOOK SIZE | PARAMETER | | | |
| --- | --- | --- | --- | --- |
| | $g_b$ | p1 | p2 | p3 |
| B1 | a | b | c | d |
| B2 | a' | b' | c' | d' |
| B3 | a" | b" | c" | d" |

FIG.4

| CODEBOOK SIZE | PARAMETER | | | |
| --- | --- | --- | --- | --- |
| | $g_b$ | p1 | p2 | p3 |
| B1 | a | b | c | d |
| | a' | b' | c' | d' |
| | a" | b" | c" | d" |
| | | | | |

FIG.5

CODEBOOK ADAPTATION METHOD, RADIO BASE STATION APPARATUS AND USER EQUIPMENT

TECHNICAL FIELD

The present invention relates to a codebook adaptation method, a radio base station apparatus and user equipment to change codebook structures adaptively.

BACKGROUND ART

Presently, drafting of standard specifications for LTE-Advanced, which is an evolved form of LTE (Long Term Evolution), is in progress in the 3GPP (3rd Generation Partnership Project). MIMO (Multi Input Multi Output) techniques in LTE-Advanced, which realize sufficiently high spectral efficiency and cell-edge user throughput in comparison to LTE, while maintaining backward compatibility with LTE, are under study. While LTE supports 4-layer transmission at a maximum, LTE-Advanced supports 8-layer transmission at a maximum. Although LTE has heretofore supported simple multi-user (MU)-MIMO, which involves main-beam control alone, LTE-Advanced employs enhanced MU-MIMO, which can reduce interference between users by means of MMSE, ZF and so on. In order to support maximum 8-layer transmission, a new reference signal (RS) has been introduced. In LTE-Advanced, the CSI-RS (Channel State Information RS), which is used only in measurement of CSI (CQI, PMI and rank), and user-specific demodulation RSs (also referred to as "UE-specific RSs," "DM-RSs," and so on), to which the same precoding is applied as with the PDSCH, and which are used only in demodulation, are defined.

CITATION LIST

Non-Patent Literature

Non-Patent Literature 1: 3GPP TR 25.913 "Requirements for Evolved UTRA and Evolved UTRAN"
Non-Patent Literature 2: 3GPP R1-114079, NTT DOCOMO, November 2011, "Further evaluations on DL MU-MIMO with increased feedback bits for single point transmission scenarios"
Non-Patent Literature 3: 3GPP R1-114080, NTT DOCOMO, November 2011, "Structured codebook design for 8 to 12 bit PMI feedback for DL MU-MIMO enhancement"

SUMMARY OF THE INVENTION

Technical Problem

Now, although LTE Release 8 employs 4-Tx downlink SU-MIMO and LTE-Advanced (Release 10) employs 4-Tx enhanced downlink MU-MIMO and 8-Tx downlink SU-MIMO, a 4-Tx codebook, which in particular supports MU-MIMO, basically has no structure and has a fixed structure, and therefore cannot cope with changes of channel characteristics flexibly. So, the present inventors have proposed codebooks (structured codebooks) that have a characteristic structure to define information about channel gain (amplitude) and phase with a plurality of parameters (non-patent literature 2 and 3). These structured codebooks can support uncorrelated channels and independent antennas by incorporating gain and phase information therein, and, furthermore, can be designed flexibly in accordance with the increase of the amount of PMI feedback information.

It is therefore an object of the present invention to provide a codebook adaptation method, a radio base station apparatus and user equipment, whereby the structure of a codebook for precoding can be adapted easily by changing parameters.

Solution to Problem

The codebook adaptation method of the present invention is a codebook adaptation method to adapt a codebook for precoding applied to downlink MIMO transmission, and this method includes the steps of: reporting a codebook size of the codebook, defined with a plurality of parameters pertaining to gain information and phase information, from one communication apparatus to another communication apparatus; and at the other communication apparatus, adapting a codebook structure by changing a bit arrangement of parameters defining the codebook, based on the codebook size reported from the one communication apparatus.

Technical advantage of the Invention

According to the present invention, it is possible to easily adapt the structures of codebooks for precoding by changing parameters.

BRIEF DESCRIPTION OF THE DRAWINGS

FIG. 3 is a diagram to show specific examples of the bit arrangement of codebook constituent parameters in association with each codebook size;
FIG. 4 is a diagram to generalize the bit arrangement of codebook constituent parameters in association with each codebook size;
FIG. 5 is a diagram to generalize the bit arrangement of codebook constituent parameters.

DESCRIPTION OF EMBODIMENTS

Figure 1:
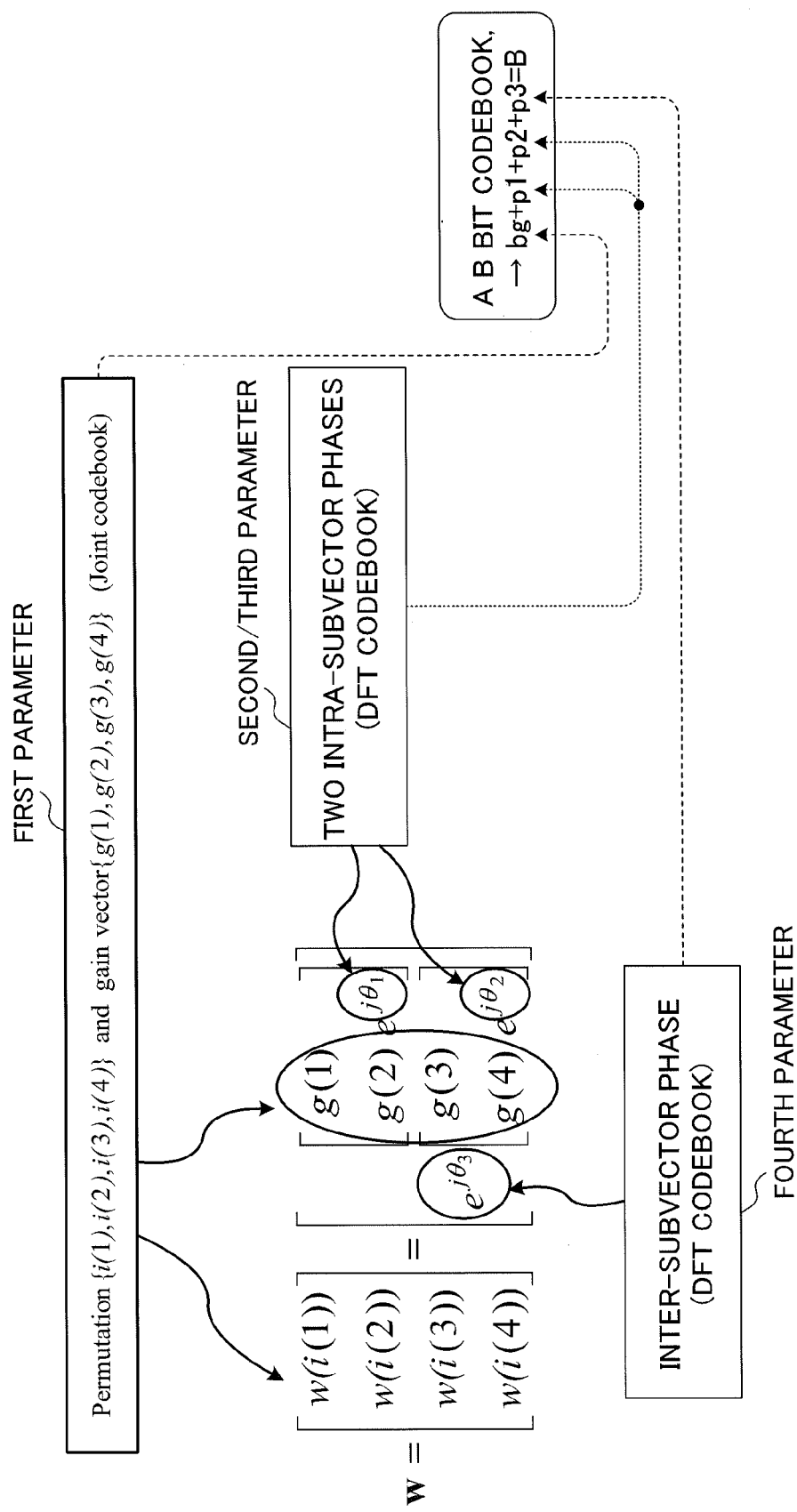
FIG. 1 is a diagram to show, conceptually, the relationship between a basic structure of a structured codebook and codebook constituent parameters.

The basic structure of a structured codebook will be described. The structured codebook to be described below is at single-point transmission in 4-Tx transmission and target MU-MIMO.

With the structured codebook which the present inventors propose, the elements in the codebook for precoding are defined with a 4×1 gain vector v. The gain vector v is defined with a plurality of parameters that represent gain information and phase information. The gain vector v, formed with 4×1 elements, is represented by information that is defined with two subvectors (2×1), so as to reduce the amount of calculation. The gain vector v to constitute the structured codebook is defined with four parameters (codebook constituent parameters) with the present example. That is, gain vector v is formed with joint indices (gain/permutation information g: the first parameter), where the elements to constitute the gain vector and their permutation (the permutation of gain elements) are joint-coded, relative phases θ1 and θ2 between elements in each subvector (intra-subvector phases: the second and third parameters), and a relative phase θ3 between the subvectors (inter-subvector phase: the fourth parameter). Note that, if 4-Tx is assumed as a premise, the total number of subvectors is two, and, given that one subvert is formed with two elements, there are two intra-subvector phases, namely θ1 (the second parameter) and θ2 (the third parameter). When the number of streams is increased, the numbers of intra-subvector phases and inter-subvector phases increase.

Assuming, for example, 4-Tx of rank 1 as a premise, gain vector v has the following structure:

[Formula 1]

$$v = \begin{bmatrix} w(i(1)) \\ w(i(2)) \\ w(i(3)) \\ w(i(4)) \end{bmatrix}$$ (Equation 1)

$$w = \begin{bmatrix} w(1) \\ w(2) \\ w(3) \\ w(4) \end{bmatrix} = \begin{bmatrix} \begin{bmatrix} g(1) \\ g(2)e^{j\theta_1} \end{bmatrix} \\ e^{j\theta_3} \begin{bmatrix} g(3) \\ g(4)e^{j\theta_2} \end{bmatrix} \end{bmatrix}$$

Here, {i(1), i(2), i(3), i(4)} is an arbitrary permutation of {1, 2, 3, 4}, and {g(1), g(2), g(3), g(4)} is a gain vector that is formed with gain elements corresponding to respective antennas (or antenna groups). The arbitrary permutation {i(1), i(2), i(3), i(4)} and gain vector {g(1), g(2), g(3), g(4)} are defined with a joint codebook (joint coding).

The bit arrangement for the above four codebook constituent parameters to constitute the structured codebook is as follows:

1. $g_b$ bits for gain/permutation information g (the first parameter) where the elements of the gain vector and their permutation (relationship in scale) are joint-coded.

2. p1 bits and p2 bits for the amounts of relative phases θ1 and θ2 (the second and third parameters) between elements in each subvector.

3. p3 bits for the amount of relative phase θ3 (the fourth parameter) between the subvectors.

If the structured codebook is a pre-coded codebook of a bit size B, $B=g_b+p1+p2+p3$ holds.

The permutation I={i(1), i(2), i(3), i(4)} and gain vector g={g(1), g(2), g(3), g(4)} are defined as a one of the combinations of 2 raised to the power of $g^b$, by means of the joint codebook.

FIG. 1 is a diagram to show, conceptually, the relationship between the basic structure of the structured codebook and the four codebook constituent parameters. The gain vector {g(1), g(2), g(3), g(4)}, formed with four gain elements supporting 4-Tx (four antennas or four antenna groups), is defined with two subvectors {g(1), g(2)} and {g(3), g(4)}. For example, if the phase of the gain element g(1) in the first subvector is fixed (for example, 0), the relative phase of the gain element g(2) with respect to the gain element g(1) is represented by θ1. The relative phase of the gain element g(4) with respect to the gain element g(3) is represented by θ2 in the second subvector. With respect to one subvector {g(1), g(2)}, the relative phase of the other subvector {g(3), g(4)} is represented by θ3.

The first parameter (gain/permutation information g) is represented by indices that are given by encoding permutation I={i(1), i(2), i(3), i(4)} and the gain vector={g(1), g(2), g(3), g(4)} using a joint codebook. The second and third parameters are represented by encoding the relative phases (θ1, θ2) of gain elements in each subvector using respective DFT codebooks. The fourth parameter is represented by encoding the relative phase (θ3) between subvectors using a DFT codebook.

Figure 2:
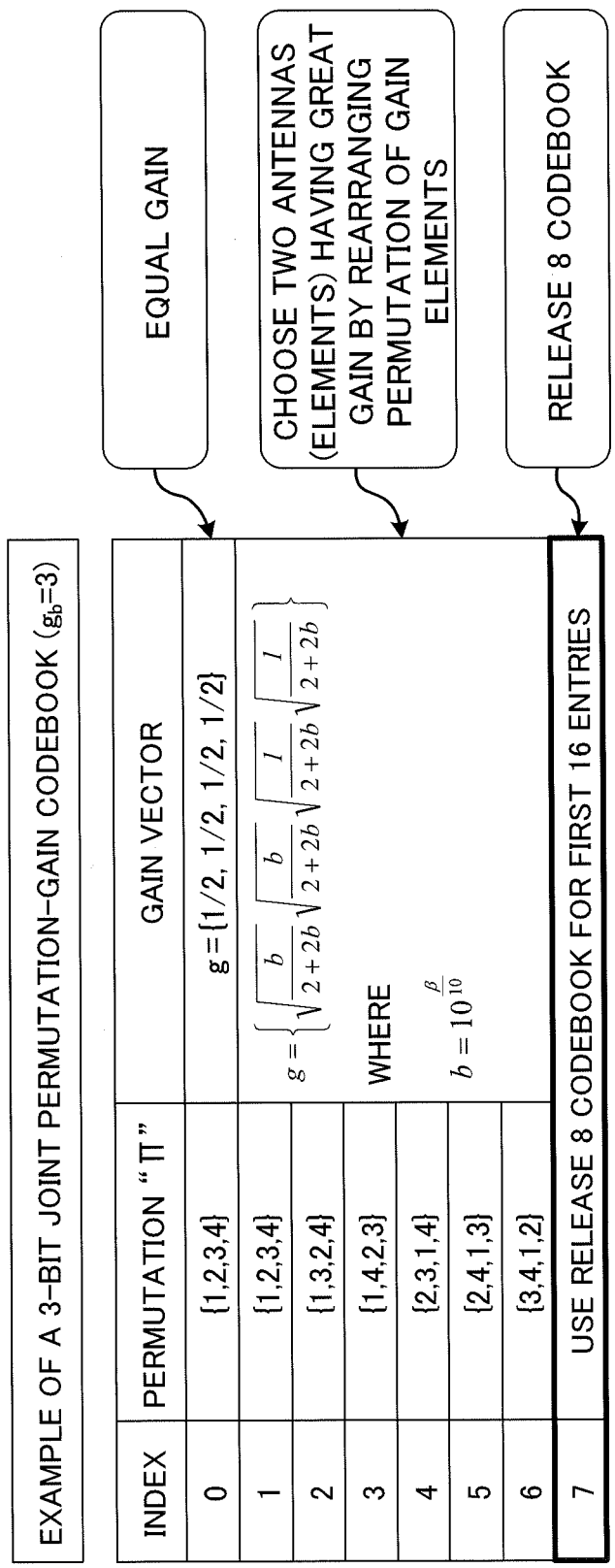
FIG. 2 is a diagram to show a structure of a joint codebook, which executes joint coding of gain vectors and the element permutations of gain vectors.

FIG. 2 shows an example of a structure of a joint codebook, whereby gain vector g, and permutation I, which specifies the order of a plurality of gain elements constituting gain vector g, are joint-coded. The size $g_b$ of this joint codebook is three bits. Two unique gain vectors are defined with this joint codebook, where one is an equal gain vector in which the four gain elements are all equal (g={1/2, 1/2, 1/2, 1/2 }), and the other one is a gain vector formed with two gain elements ([(1/(2+2b)]$^{1/2}$) and two gain elements ([(b/(2+2b)]$^{1/2}$) that are "b" times bigger than these two gain elements (dB), where b=10$^{β/10}$ holds. The numerical value β defines the scale of the gain elements (dB). If the numerical value is β>0, information regarding the relationship in scale, indicating, for example, the elements g(1) and g(2) are equal, the elements g(3) and g(4) are equal, g(1) (or g(2)) and g(3) (or g(4)) are not equal, and so on, is represented. g(1) (or g(2)) has power that is "b" times bigger than that of g(3) (or g(4)) (which is (b)$^{1/2}$ times bigger, with amplitude). Permutations I to correspond to indices 1 to 6 respectively represent all the combinations (six combinations) of two antennas having greater gain than the other two antennas. The codebook parameter "b" is determined based on intensive search and channel characteristics.

The permutation I={1, 2, 3, 4} to correspond to the index 1 of the joint codebook represents that the gain elements (dB) of the first antenna and the second antenna are equal (g(1)=g(2)), the gain elements (dB) of the third antenna and the fourth antenna are equal (g(3)=g(4)), and the gain element of the first and second antennas ((g(1)=g(2)) is "b" times bigger than the gain element of the third and fourth antennas (g(3)=g(4)) (in power).

Similarly, permutation I={1, 3, 2, 4} corresponding to the index 2 represents that the gains of the first antenna and the third antenna are equal, the gains of the second antenna and the fourth antenna are equal, the gain of the first and third antennas is "b" times bigger than the gain of the second and fourth antennas (in power). As for permutations I corresponding to the indices 3 to 6, similarly, combinations of two antennas of maximum gain and combinations of two antennas having smaller gain than that, are presented.

The index 7 is used for other gain vectors. In the example shown in FIG. 2, the index 7 indicates that a 4-bit PMI codebook defined in LTE (Rel. 8) is used.

Next, examples of phase codebooks for encoding phase information θ1, θ2 and θ3 will be described. For each of phase information θ1, θ2 and θ3, one phase codebook is required, and so three phase codebooks are required for the whole phase information. Each phase codebook can be formed with a DFT codebook. Intra-subvector phases θ1 and θ2 can be represented by codebooks that are formed with two-dimensional vector elements, and are defined with relative phase between scalar entries. Assume that the same phase codebook is used for intra-subvector phases θ1 and θ2. An example of the intra-subvector phase codebook for encoding θ1 and θ2 is represented by equation 2:

[Formula 2]

$$\text{Intra-subvector phase codebook } "k" = \Phi_k$$
$$= \left\{ \begin{bmatrix} 1 \\ e^{j2\pi 0/P_k} \end{bmatrix} \begin{bmatrix} 1 \\ e^{j2\pi 1/P_k} \end{bmatrix} \cdots \begin{bmatrix} 1 \\ e^{j2\pi(P_k-1)/P_k} \end{bmatrix} \right\}$$
$$= \{ \phi_{k,0} \quad \phi_{k,1} \quad \cdots \quad \phi_{k,P_k-1} \} \text{ where } P_k = 2^{p_k}$$

(Equation 2)

An example of the inter-subvector phase codebook for encoding phase information θ3 is represented by equation 3. The inter-subvector phase codebook has the same structure as that of the intra-subvector phase codebook, except that no scalar value is provided therein.

[Formula 3]

$$\text{Inter-subvector phase codebook } \Omega = \{ e^{j2\pi 0/P_3} \quad e^{j2\pi 1/P_3} \quad \cdots \quad e^{j2\pi(P_3-1)/P_3} \}$$
$$= \{ \omega_0 \quad \omega_1 \quad \cdots \quad \omega_{P_3-1} \} \text{ where } P_3 = 2^{p_3}$$

(Equation 3)

These phase codebooks represent uniform sampling of phase between 0 and 2π. The granularity of phase sampling is determined by the numerical values of bits p1, p2 and p3, distributed to phase information θ1, θ2 and θ3.

If 4-Tx is assumed as a premise (FIG. 1), the structured codebook which the present inventors propose can compress and encode each antenna's (or each antenna group's) gain information (gain vector) by means of joint coding with permutation I, and encode phase information between antennas (or between antenna groups) in the form of intra-subvector phases (θ1, θ2) and an inter-subvector phase (θ3). As the number of bits to allocate to the indices representing the gain vector and its permutation (the first parameter) increases, the number of combinations of the gain vector and its permutation increases, so that it is possible to define more gain information (the number of antennas that can be supported, the relationship between antennas in terms of the scale of gain, and so on). As the number of bits to allocate to intra-subvector phases (θ1 and θ2: the second and third parameters) and inter-subvector phase (θ3: the fourth parameter) increases, it is possible to define more phase information (the number of elements of intra-subvectors, which is three or more, the number of vectors with inter-subvectors, which is three or more, and so on).

The present inventors have focused on the fact that the structure of the structured codebook changes depending on the number of bits to allocate to the first to fourth parameters, which are parameters pertaining to gain information and phase information that define the structured codebook (that is, depending on the bit arrangement of parameters), and have arrived at the present invention to allow the structure of the structured codebook to be adaptive to conditions such as channel characteristics, antenna configuration, and so on.

FIG. 3 is a table to show the bit arrangement of the first to fourth parameters defining a structured codebook. Two examples of bit arrangements are shown as 8-bit codebooks, and two examples of bit arrangements are shown as 12-bit codebooks. $g_b$ is allocated to the first parameter (that is, gain/permutation information g, which is represented by an index where gain and its permutation I are joint-coded), p1 is allocated to the second parameter (that is, intra-subvector phase θ1), p2 is allocated to the third parameter (that is, inter-subvector phase θ2), and p3 is allocated to the fourth parameter (that is, inter-subvector phase θ3).

The codebook structure (the bit arrangement of codebook constituent parameters) is switched based on channel characteristics (as to, for example, whether the area is a local area or a wide area) and antenna configuration (as to, for example, whether the antenna is an in-phase polarization antenna or an orthogonal polarization antenna). By this means, it is possible to adapt the structured codebook to channel characteristics and antenna configuration.

It is important that gain information allows effective quantization of uncorrelated channels, and it is also important that phase information allows effective quantization of correlated channels. For example, when making the structured codebook adapt to quantization of uncorrelated channels, it is preferable to allocate a large numerical value bits $g_b$ to the first parameter (gain/permutation information g) pertaining to gain information. When making the structured codebook adapt to quantization of correlated channels, it is preferable to allocate large numerical values of bits p1 to p3 to the second, third and fourth parameters corresponding to phase information.

In the table shown in FIG. 3, the bit arrangement that is adaptive to quantization of correlated channels in the event of the codebook size of 8 bits is: $g_b$=0, p1=3, p2=2, and p3=3. The bit arrangement that is adaptive to quantization of correlated channels in the event of the codebook size of 12 bits is: $g_b$=0, p1=4, p2=4 and p3=4.

Referring to the table shown in FIG. 3, the bit arrangement that is adaptive to quantization of uncorrelated channels in the event of the codebook size of 8 bits is: $g_b$=2, p1=2, p2=2 and p3=2. The bit arrangement that is adaptive to quantization of uncorrelated channels in the event of the codebook size of 12 bits is: $g_b$=3, p1=3, p2=3 and p3=3.

With the joint codebook shown in FIG. 2, the codebook size $g_b$ is three bits, so that seven types of gain setting corresponding to indices 1 to 6 are supported. If the gain setting for a plurality of antennas (or antenna groups) is fixed, $g_b$=0 can hold.

Next, specific codebook adaptation methods of the structured codebook structured as described above will be described.

With the above structured codebook, it is possible to easily adapt the codebook structure to channel characteristics and so on by reporting the codebook constituent parameters to user equipment (when the user equipment is capable of determining parameters, the codebook constituent parameters are reported to the base station apparatus). The method of signaling control signals for codebook structure adaptation will be proposed below. The base station apparatus or user equipment that is capable of determining parameters constitutes one communication apparatus, and the base station apparatus or user equipment to receive the parameter determining results constitutes the other communication apparatus.

(Method 1)

A mapping table, in which the codebook size B and the bit arrangement of codebook constituent parameters are associated with each other, is shared between a base station eNB and user equipment UE in advance, and the codebook size B is reported from the base station eNB to the user equipment UE (when the user equipment is capable of determining parameters, the codebook size B is reported to the base station apparatus). The user equipment UE specifies the bit arrangement of codebook constituent parameters to correspond to the codebook size B using the mapping table, and adapts the codebook structure so that the specified bit arrangement of codebook constituent parameters is assumed.

FIG. 4 shows a configuration example of a mapping table in which the codebook size B and the bit arrangement of codebook constituent parameters are associated with each other.

In the event of the codebook size=B1, the number of bits of the first parameter (gain/permutation information g) is defined to be $g_b$=a, the number of bits of the second parameter (intra-subvector phase θ1) is defined to be p1=b, the number of bits of the third parameter (intra-subvector phase θ2) is defined to be p2=c, and the number of bits of the fourth parameter (inter-subvector phase θ3) is defined to be p3=d. Here, B1=a+b+c+d holds. In the event of the codebook size=B2, $g_b$=a', p1=b', p2=c' and p3=d' are defined. Here, B2=a'+b'+c'+d' holds. In the event of the codebook size=B3, $g_b$=a", p1=b", p2=c" and p3=d" are defined. Here, B3=a"+b"+c"+d" holds.

The bit arrangements of codebook constituent parameters to correspond to the codebook sizes B1, B2 and B3 shown in FIG. 4 correspond to codebook structures applicable to different channel characteristics and/or different antenna configurations. One of the base station eNB and the user equipment UE determines on the codebook size B1, B2 or B3, and reports the determined codebook size to the communicating party.

As shown in FIG. 3, in a case where two types of codebook constituent parameter bit arrangements are defined with respect to the codebook size of 8 bits, the bit arrangement of codebook constituent parameters cannot be specified uniquely by only signaling the codebook size B. Then, when two bits are used to report the codebook size, four types of codebooks cannot be identified. By associating codebook types and 2-bit data with each other such as Ba (8 bit)=00, Bb (8 bits)=01, Bc (12 bits)=10 and Bd (12 bits)=11, even when the codebook size is the same (for example, 8 bits), it is possible to identify between Ba=00 and Bb=01.

(Method 2)

The bit arrangement of codebook constituent parameters is reported from the base station eNB to the user equipment UE. The user equipment UE adapts the codebook structure so that the reported bit arrangement of codebook constituent parameters is assumed (when the user equipment is capable of determining parameters, the bit arrangement of codebook constituent parameters is reported to the base station apparatus). The base station eNB executes precoding based on the premise that the codebook structure is adapted so that the reported bit arrangement of codebook constituent parameters is assumed.

FIG. 5 shows a table in which three types of bit arrangements of codebook constituent parameters are defined with respect to the same codebook size B. B1=a+b+c+d=a'+b'+c'+d'=a"+b"+c"+d" holds. It is equally possible to define one bit arrangement of codebook constituent parameters with respect to one codebook size B.

Even when the codebook size B is the same, by reporting the bit arrangement of the codebook constituent parameters of the structured codebook itself, it is possible to make flexible adaptation to many codebook structures, without limiting the code bits of the codebook size.

Instead of reporting all the codebook constituent parameter bit arrangements, it is equally possible to limit this reporting to only part of the bit arrangements of codebook constituent parameters. From part of the bit arrangements of codebook constituent parameters reported, the rest of the bit arrangements of codebook constituent parameters may be determined. By this means, it is possible to reduce the signaling overhead related to the bit arrangement of codebook constituent parameters.

For example, as shown in FIG. 3, assume a case where two types of codebook constituent parameter bit arrangements are defined with respect to the codebook size of 8 bits. If $g_b$=0 holds with respect to the bit arrangement of the first parameter (gain/permutation information g), the bit arrangement for the rest of the parameters is determined to be p1=3, p2=2 and p3=3. In the event of $g_b$=2, the bit arrangement of the rest of the parameters is determined to be p1=2, p2=2 and p3=2. In this case, by only signaling $g_b$=0 as the bit arrangement of the first parameter (gain information), the communicating party, to which $g_b$=0 is reported, is able to decide that the bit arrangement of the rest of the parameters is p1=3, p2=2 and p3=3.

(Method 3)

"b," which is the codebook parameter to define the scale of gain elements in the joint codebook, is determined in the base station eNB and reported to the user equipment UE. Alternatively, the codebook parameter "b" is determined in the user equipment UE and reported to the base station eNB. As noted earlier, the codebook parameter "b" is a parameter to indicate how much two gain elements constituting the gain vector are bigger than the other two gain elements. The codebook parameter "b" may be reported semi-statically through higher layer signaling (for example, through RRC signaling).

The base station eNB or the user equipment UE can determine the value of the parameter "b," which defines the scale of gain elements, based on channel characteristic estimation results and/or area conditions (as to, for example, the area is a wide area or a small area). For example, channel correlations and propagation characteristics vary between a wide area and a small area. So, the base station eNB or the user equipment UE selects, for example, a relatively small numerical value for the value of the parameter "b" when a channel has high channel correlation, or selects a relatively large numerical value for the value of the parameter "b" when a channel has low channel correlation.

Figure 6:
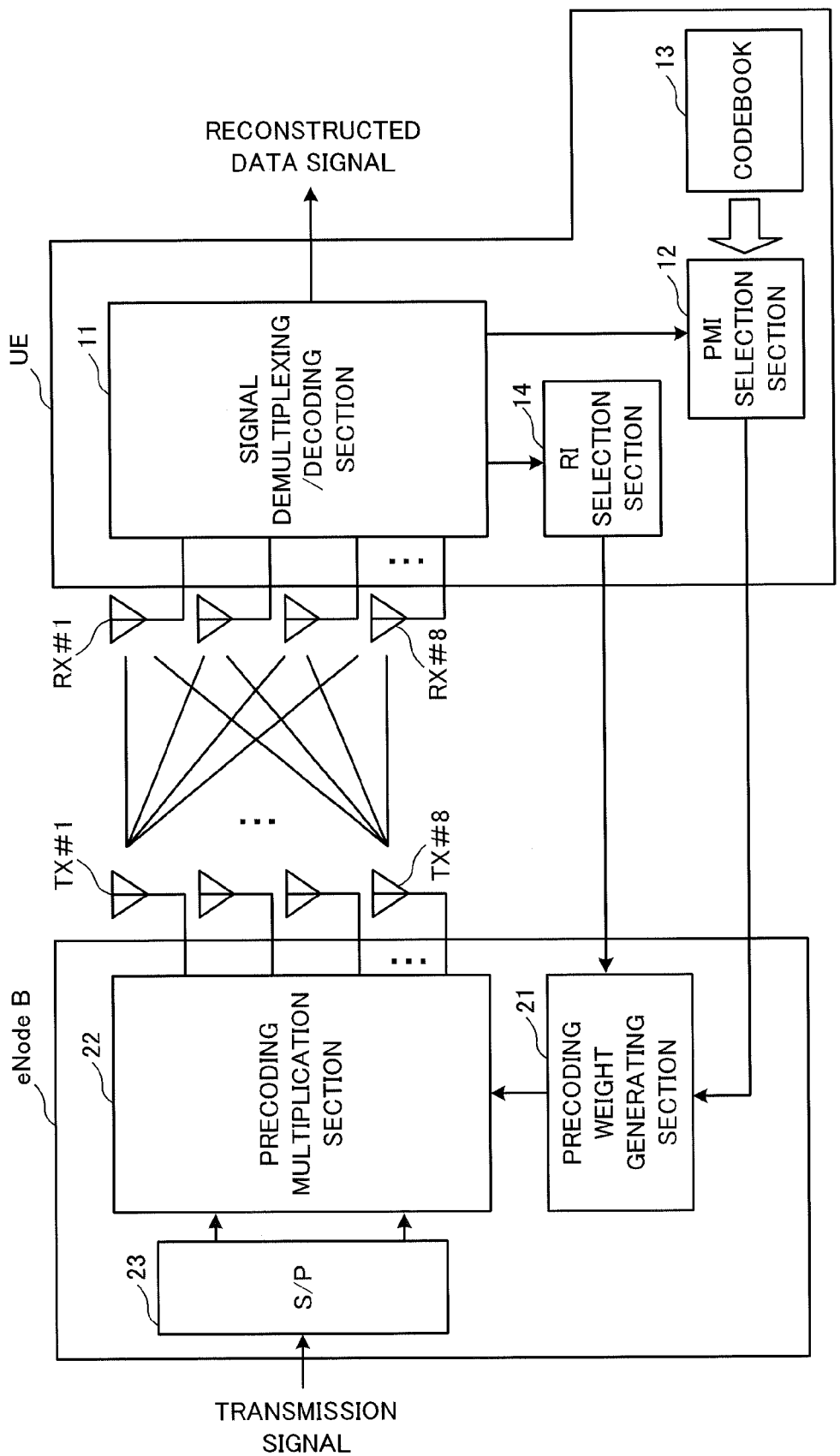
FIG. 6 is a conceptual diagram of a MIMO system.

Now, an embodiment of the present invention will be described below in detail with reference to the accompanying drawings. First, precoding in downlink MIMO transmission in an LTE-A system will be described assuming the MIMO system shown in FIG. 6 as a premise. FIG. 6 is a conceptual diagram of a MIMO system. With the MIMO system shown in FIG. 6, a case is illustrated where a base station eNB and user equipment UE each has eight antennas. Assuming 4-Tx, for example, layer mapping is carried out such that two codewords are mapped to four layers, and antenna mapping is carried out by multiplying four layer signals by precoder vectors so that four layer signals are mapped to eight antennas.

In precoding in downlink MIMO transmission, user equipment UE measures the amount of channel variation using received signals from each antenna, and, based on the measured amount of channel variation, select PMIs (Precoding Matrix Indicators) and RIs (Rank Indicators) to match the amount of phase/amplitude control (precoding weight) that maximizes the throughput (or the received SINR (Signal to Interference and Noise Ratio)) after transmission data from each transmission antenna of the base station eNB is combined. Then, the selected PMIs and RIs are fed back to the base station eNB on the uplink with CQIs (Channel Quality Indicators) that represent channel quality information. The base station eNB pre-codes the transmission data based on the PMIs and RIs fed back from the user equipment UE, and, after that, transmits information from each antenna.

In the user equipment UE shown in FIG. 6, a signal demultiplexing/decoding section 11 executes signal demultiplexing and data decoding of control channel signals and data channel signals included in received signals received via receiving antennas RX #1 to RX #8. The data channel signals are reconstructed by the decoding in the signal demultiplexing/decoding section 11. A PMI selection section 12 selects PMIs according to the channel state estimated by a channel estimation section, which is not illustrated. When this takes place, the PMI selection section 12 selects optimal PMIs from a codebook 13, in which $N=2^B$ known precoding weights (precoding matrices) and PMIs to be associated with these precoding weights are defined on a per rank basis in both the user equipment UE and the base station eNB. The codebook 13 has a joint codebook generating section that generates the joint codebook shown in FIG. 2, and three phase codebook generating sections that generate the intra-subvector phase codebooks represented by equation 2 (the phase codebooks to quantize phase information θ1 and θ2), and the inter-subvector phase codebook shown with equation 3 (the phase codebook to quantize phase information θ3). The intra-subvector phase codebooks and the inter-subvector phase codebook are constituted with DFT codebooks. PMI information (B) is formed with bit information (p1, p2, p3 and $g_b$) that is determined by feedback of phase information θ1, θ2 and θ3 and selection of gain information g (B=p1+p2+p3+$g_b$). There are $N=2^B$ candidate precoding matrices. An RI selection section 14 selects the RIs according to the channel state estimated by the channel estimation section. These PMI and RI are transmitted to the base station eNB, as feedback information, with CQIs that represent channel quality information.

In the base station eNB shown in FIG. 6, a precoding weight generating section 21 generates precoding weights based on PMIs and RIs fed back from the user equipment UE. The precoding weight generating section 21 has configuration information (the bit arrangement of codebook constituent parameters) related to the codebook 13 used in the user equipment UE memorized in a memory, and generates precoding weights to match PMIs and RIs in accordance with the codebook structure. A precoding multiplication section 22 controls (shifts) the phase/amplitude, for each of transmitting antennas TX #1 to TX #8 by multiplying transmission signals having been subjected to parallel conversion in a serial-to-parallel conversion section (S/P) 23 by the precoding weights.

By this means, transmission data, to which a phase/amplitude shift has been applied, is transmitted from eight transmitting antennas TX #1 to TX #8.

The MIMO system according to the present embodiment changes the structure of the codebook 13 adaptively, depending on environment concerning whether or not the area is a wide area or a local area, whether or not there is antenna correlation, and so on.

When the above method 1 is applied, a mapping table, in which the codebook size B and the bit arrangement of codebook constituent parameters are associated with each other, is shared in advance between the base station eNB and the user equipment UE. For example, the mapping table shown in FIG. 4 is held in both the base station eNB and the user equipment UE. Either the base station eNB or the user equipment UE determines an adequate codebook structure (bit arrangement of codebook constituent parameters), and generates bit data that represents a codebook size B (B1, B2, or B3) to match the determined codebook structure. This example will be described such that the base station eNB determines an adequate codebook structure.

When the base station eNB quantizes uncorrelated channels efficiently, gain information holds greater significance, so that it is preferable to select a codebook size B in which a larger number of bits are allocated to the codebook constituent parameters pertaining to gain information (indices acquired by the joint codebook shown in FIG. 2). When quantizing correlated channels efficiently, phase information is more important, so that it is preferable to select a codebook size B in which a larger number of bits are allocated to the codebook constituent parameters pertaining to phase information (phase information derived from the phase codebooks defined with equations 2 and 3).

When the base station eNB selects, for example, the codebook size B1 shown in FIG. 4, the base station eNB reports bit data to represent the codebook size B1 to the user equipment UE as a higher control signal through higher layer signaling. When the codebook size B1 is reported, the user equipment UE changes the bit arrangement of the codebook constituent parameters of the codebook 13 to codebook constituent parameters corresponding to the codebook size B1 ($g_b$=a, p1=b, p2=c and p3=d). When the codebook 13 is constituted in the codebook constituent parameter bit arrangement of the first row shown in FIG. 3 ($g_b$=0, p1=3, p2=2 and p3=3), a codebook 13 that does not contain gain information is built. When the codebook 13 is constituted in the codebook constituent parameter bit arrangement of the second row shown in FIG. 3 ($g_b$=3, p1=3, p2=3 and p3=3), the three-bit joint codebook shown in FIG. 2 is built with respect to the quantization of gain information.

When the codebook structure is changed, this primarily means changing the bit arrangement of codebook constituent parameters.

As a result of this, by means of signaling of the codebook size, the codebook structure of the codebook 13 of the user equipment UE is changed adaptively.

When above method 2 is applied, either the base station eNB or the user equipment UE determines an adequate codebook structure (bit arrangement of codebook constituent parameters), and generates bit data to represent a bit arrangement of codebook constituent parameters ($g_b$, p1, p2 and p3) matching the determined codebook structure. The present example will be described such that the base station eNB determines an adequate codebook structure.

When the base station eNB quantizes uncorrelated channels efficiently, it is preferable to select a bit arrangement of codebook constituent parameters in which a larger number of bits are allocated to the codebook constituent parameter ($g_b$) pertaining to gain/permutation information g. When quantizing correlated channels efficiently, it is preferable to select a bit arrangement of codebook constituent parameters in which a larger number of bits are allocated to the codebook constituent parameters (P1, P2 and P3) pertaining to phase information.

When the base station eNB selects, for example, the bit arrangement of the first row shown in FIG. 5 ($g_b$=a, p1=b, p2=c and p3=d), the base station eNB reports bit data to represent the bit arrangement of the first column ($g_b$=a, p1=b, p2=c and p3=d) to the user equipment UE as a higher control signal through higher layer signaling. When the bit arrangement of codebook constituent parameters ($g_b$=a, p1=b, p2=c and p3=d) is reported, the user equipment UE changes the bit arrangement of the codebook constituent parameters ($g_b$, p1, p2 and p3) of the codebook 13 based on that bit arrangement ($g_b$=a, p1=b, p2=c and p3=d). When the codebook 13 is constituted in the codebook constituent parameter bit arrangement of the first row shown in FIG. 3 ($g_b$=0, p1=3, p2=2 and p3=3), a codebook 13 that does not contain gain information is built. When the codebook 13 is constituted in the codebook constituent parameter bit arrangement of the second row shown in FIG. 3 ($g_b$=3, p1=3, p2=3 and p3=3), the three-bit joint codebook shown in FIG. 2 is built with respect to the quantization of gain information.

As a result of this, by means of signaling of the bit arrangement of codebook constituent parameters, the codebook structure of the codebook 13 of the user equipment UE is changed adaptively.

When above method 3 is applied, either the base station eNB or the user equipment UE determines an adequate gain parameter "b" and generates bit data to represent the determined gain parameter "b." The present example will be described such that the base station eNB determines an adequate codebook structure.

When combining method 1 and method 3, the gain parameter "b" can be transmitted together with the codebook size B that is signaled by above method 1, or may be signaled independently of the codebook size B.

When combining method 2 and method 3, the gain parameter "b" may be transmitted together with the bit arrangement of codebook constituent parameters that is signaled by above method 2, or may be signaled independently of the bit arrangement of codebook constituent parameters.

Figure 7:
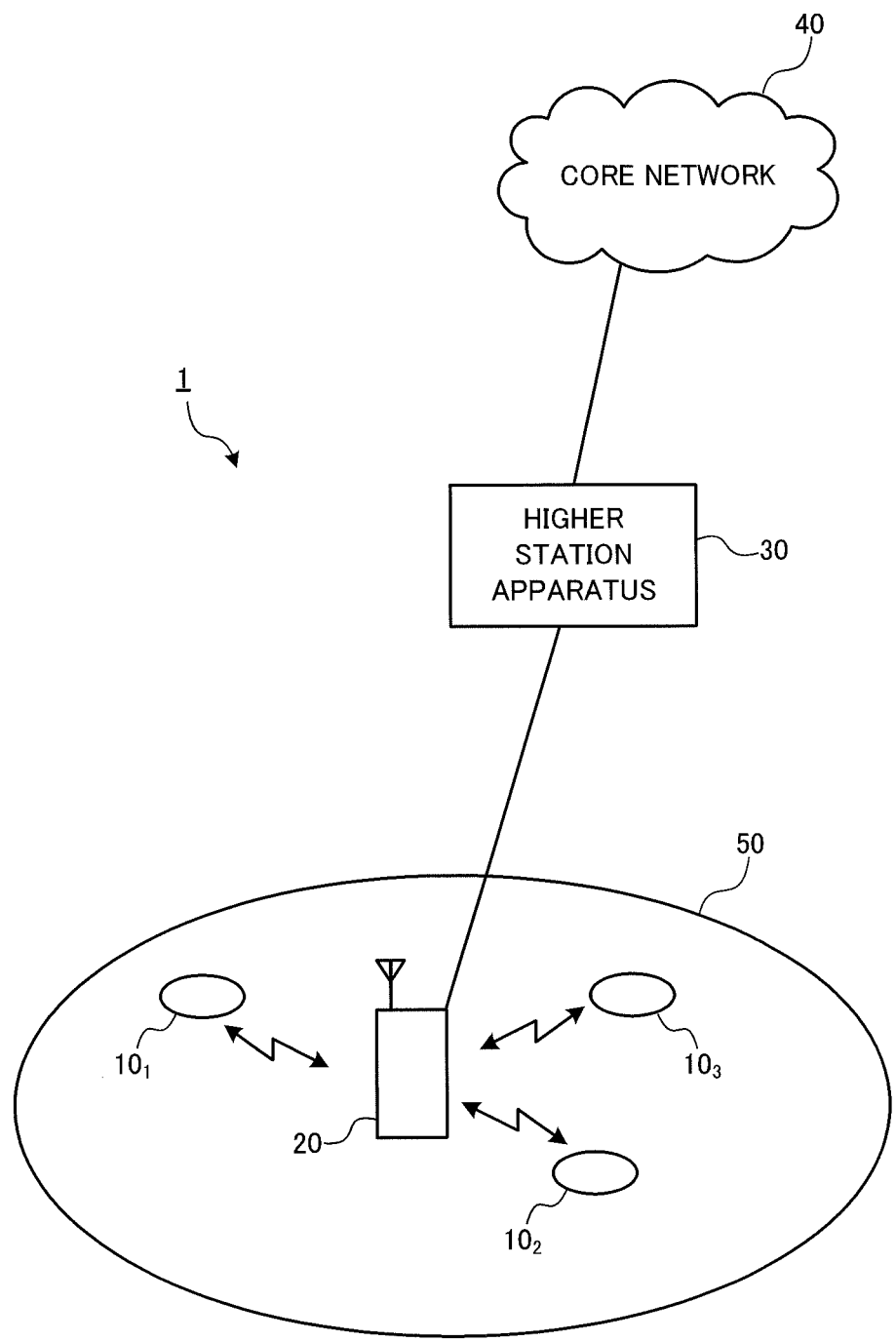
FIG. 7 is a diagram to explain a configuration of a mobile communication system according to an embodiment of the present invention.

Now, a mobile communication system 1 having user equipment (UE) 10 and a base station (eNB) 20 according to an embodiment of the present invention will be described with reference to FIG. 7. FIG. 7 is a diagram to explain the configuration of the mobile communication system 1 having the user equipment 10 and the base station 20 according to an embodiment of the present invention. Note that the mobile communication system 1 shown in FIG. 7 is a system to accommodate, for example, the LTE system or SUPER 3G. This mobile communication system 1 may be referred to as "IMT-Advanced" or may be referred to as "4G."

As shown in FIG. 7, the mobile communication system 1 is configured to include a base station 20 and a plurality of user equipment 10 ($10_1$, $10_2$, $10_3$, ... $10_n$, where n is an integer to satisfy n>0) that communicates with this base station 20. The base station 20 is connected with a higher station apparatus 30, and this higher station apparatus 30 is connected with a core network 40. The user equipment 10 communicates with the base station 20 in a cell 50. Note that the higher station apparatus 30 may be, for example, an access gateway apparatus, a radio network controller (RNC), a mobility management entity (MME) and so on, but is by no means limited to these.

Each user equipment ($10_1$, $10_2$, $10_3$ ... $10_n$) has the same configuration, functions and state, and therefore will be described simply as "user equipment 10," unless specified otherwise. Although the user equipment 10 will be described to perform radio communication with the base station 20 for ease of explanation, more generally, both mobile terminal apparatuses and fixed terminal apparatuses may be included as well.

In the mobile communication system 1, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, communication channels in the LTE system will be described. On the downlink, a PDSCH (Physical Downlink Shared Channel), which is shared by each user equipment 10, and downlink L1/L2 control channels (a PDCCH (Physical Downlink Control Channel), a PCFICH (Physical Control Field Indicator Channel), and a PHICH (Physical Hybrid automatic repeat request Indicator Channel)) are used. By means of this PDSCH, higher control signals and user data are transmitted. The higher control signals contain information for changing the codebook structure adaptively. Note that the component carriers and scheduling information allocated to the user equipment 10 in the base station 20 are reported to the user equipment 10 through the L1/L2 control channels.

On the uplink, a PUSCH (Physical Uplink Shared Channel), which is used by each user equipment 10 on a shared basis, and a PUCCH (Physical Uplink Control Channel), which is an uplink control channel, are used. User data is transmitted by means of this PUSCH. By means of the PUCCH, downlink radio quality information (CQI) and so on are transmitted.

Figure 8:
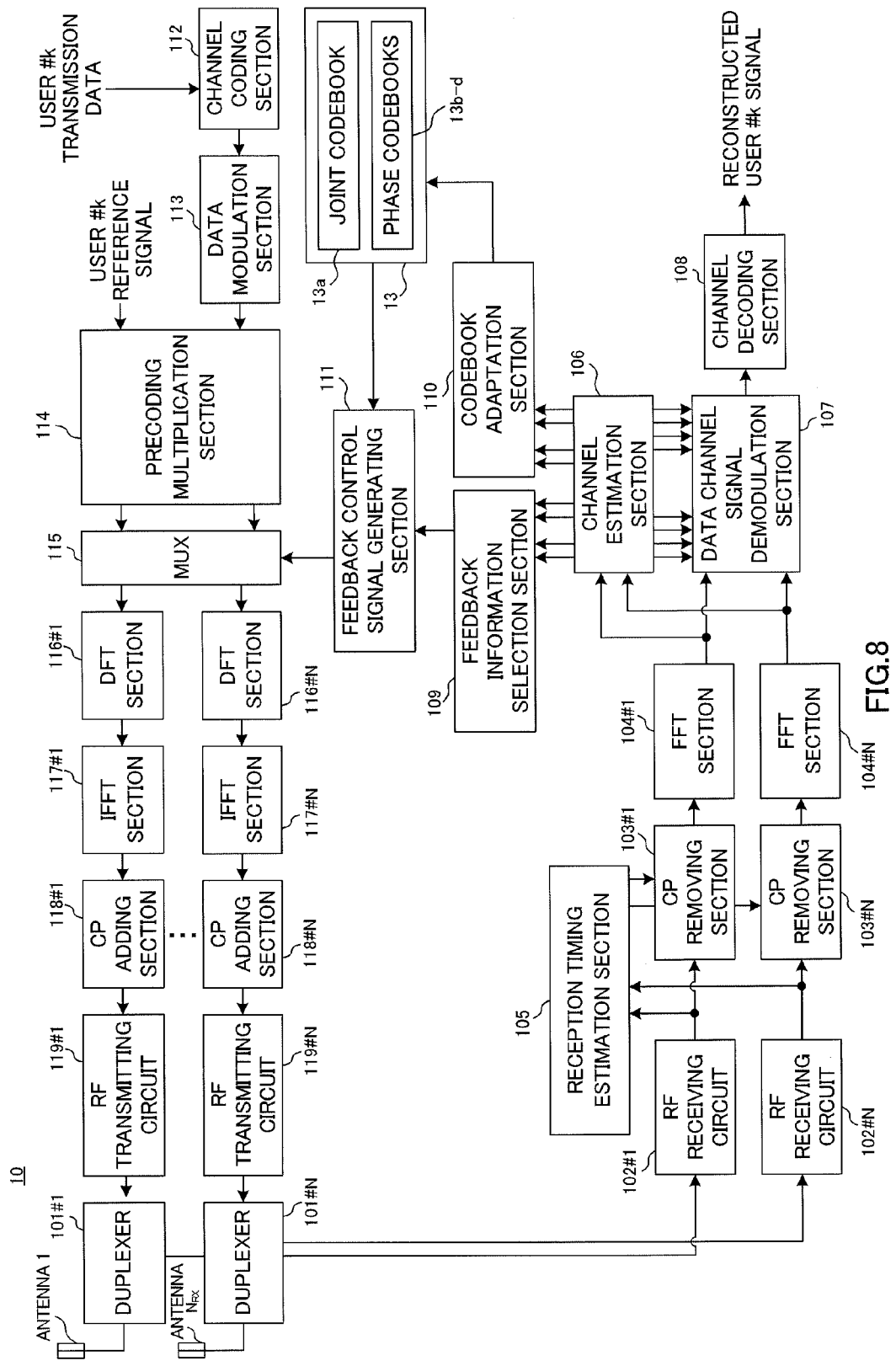
FIG. 8 is a block diagram to show a configuration of user equipment according to an embodiment of the present invention.
Figure 9:
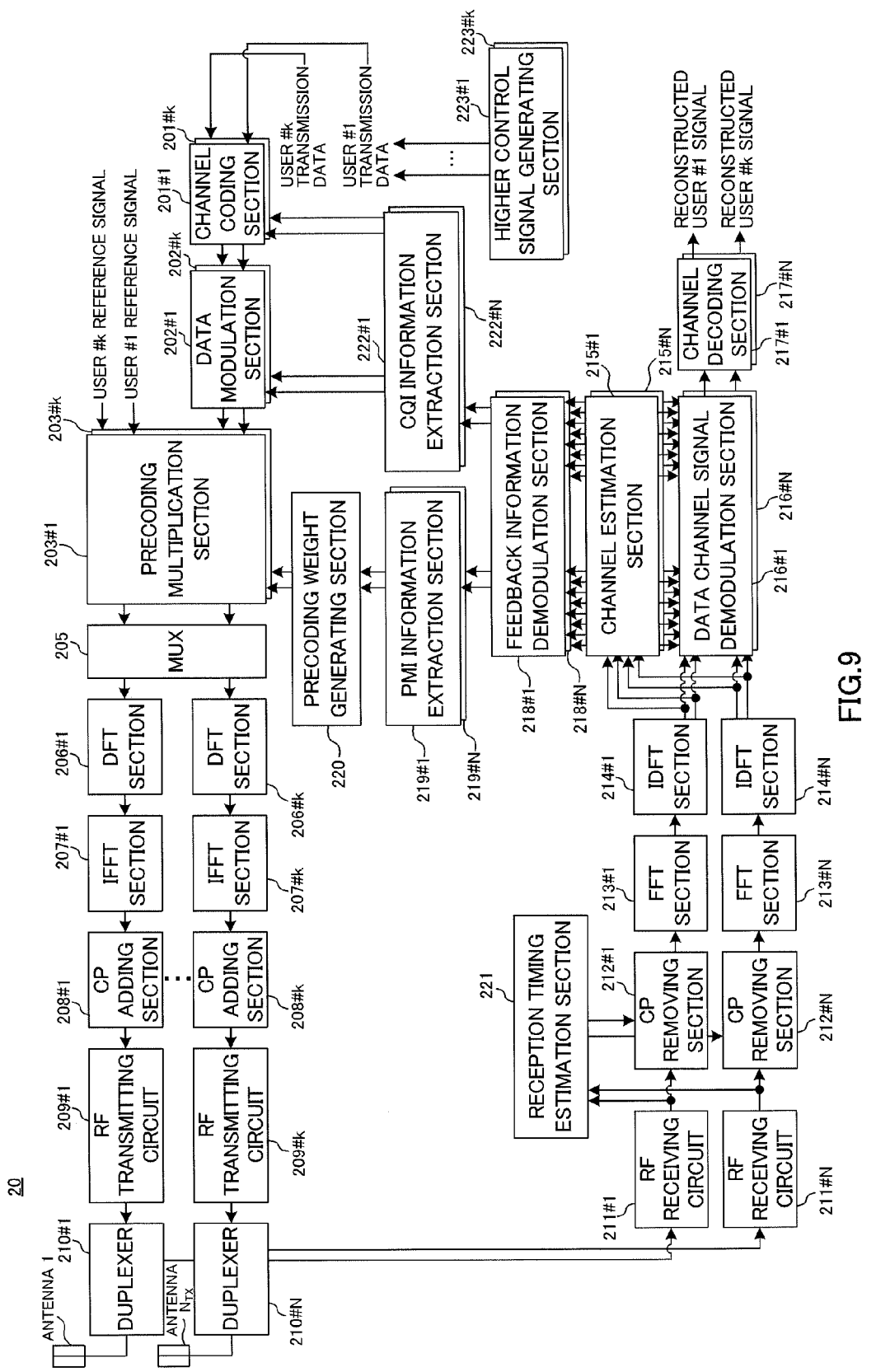
FIG. 9 is a block diagram to show a configuration of a base station according to an embodiment.

FIG. 8 is a block diagram to show a configuration of the user equipment 10, and FIG. 9 is a block diagram to show a configuration of the base station 20. Here, a case will be described where the user equipment 10 is capable of determining the codebook structure and the base station 20 adapts to the codebook structure reported from the user equipment 10. Note that the configurations of the user equipment 10 and the base station 20 illustrated in FIG. 8 and FIG. 9 are simplified to explain the present invention, and both have configurations which a general mobile terminal apparatus and base station apparatus should have. The user equipment 10 and the base station 20 can obviously have processors, memories, displays, operating parts and so on, which are not illustrated.

In the user equipment 10 shown in FIG. 8, transmission signals transmitted from the base station 20 are received in antennas 1 to $N_{RX}$, electrically separated into the transmitting route and the receiving route in duplexers 101 #1 to 101 #N, and, after that, output to RF receiving circuits 102 #1 to 102 #N. Then, in RF receiving circuits 102 #1 to 102 #N, the signals are converted from radio frequency signals into baseband signals through frequency conversion, and, after that, output to a receiving time estimation section 105 and CP removing sections 103 #1 to 103 #N. The receiving time estimation section 105 estimates the receiving times with the received signals after the frequency conversion, and outputs these receiving times to CP removing sections 103 #1 to 103 #N. The CPs (Cyclic Prefixes) are removed in CP removing sections 103 #1 to 103 #N, a Fourier transform is performed in fast Fourier transform sections (FFT sections) 104 #1 to 104 #N, and the signals are converted from time sequence signals to frequency domain signals. The received signals having been converted into frequency domain signals are output to a channel estimation section 106 and a data channel signal demodulation section 107.

The channel estimation section 106 estimates channel states from the reference signals included in the received signals output from FFT sections 104 #1 to #N, and reports the estimated channel states to a data channel signal demodulation section 107, a feedback information selection section 109, and a codebook adaptation section 110. The data channel signal demodulation section 107 demodulates the data channel signal based on the reported channel states. The demodulated data channel signal is subjected to channel decoding in a channel decoding section 108 and converted back to the user #k signal.

The feedback information selection section 109 selects PMIs from the codebook 13 based on the channel states reported from the channel estimation section 106. The codebook 13 is a structured codebook, the codebook structure of which can be changed adaptively based on the bit arrangement of the codebook constituent parameters. The codebook 13 is configured to include a joint codebook 13a (FIG. 2) that is used to encode gain information, and three phase codebooks 13b to 13d that are used to encode phase information (θ1, θ2, and θ3). The phase codebooks have two intra-subvector phase codebooks 13b and 13c (equation 2) that encode two intra-subvector phases θ1 and θ2, respectively, and one inter-subvector phase codebook 13d (equation 3) that encodes inter-subvector phase θ3. When the structured codebook is applied, a PMI (a set of feedback bits) is formed with a set of phase information θ1 (p1), θ2 (p2) and θ3 (p3) selected by the three phase codebooks 13b to 13d and gain/permutation information g ($g_b$) selected by the joint codebook of FIG. 2.

The PMI search method using the codebook 13 formed with a structured codebook will be described. The feedback information selection section 109 creates a correlation matrix of channel matrices, and extracts an eigenvector "v" by performing an eigenvalue decomposition of this correlation matrix. A channel matrix refers to a matrix that is formed with the amounts of variation with the amplitude and phase of the propagation path between each transmitting antenna and receiving antenna. The structure "w" that is the closest to this eigenvector "v" is searched for (as for v and w, see equation 1). To search for the structure "w," the absolute value of each element of the eigenvector "v" is calculated, and the amplitude components of the eigenvector "v" are extracted. The amplitude components of the elements of the eigenvector "v" are gain elements g(1), g(2), g(3) and g(4). With the permutations of the gain elements g(1), g(2), g(3) and g(4), the one that is the closest to the eigenvector "v" is searched for. The permutations of the gain the elements g(1), g(2), g(3) and g(4) that is the closest to the eigenvector "v" carries information as to which elements are bigger than which elements, and information as to which elements are bigger by "b" or more than which elements. The permutation of the gain elements g(1), g(2), g(3) and g(4) that is the closest to the eigenvector "v" is searched for, and an index to represent the searched permutation is fed back.

The codebook adaptation section 110 adapts the structure of the codebook 13, which is a structured codebook, based on the channel state reported from the channel estimation section 106. The adaptation method of the codebook 13 adopts one of above-described methods 1, 2 and 3.

The feedback information selection section 109 selects RIs based on the channel state reported from the channel estimation section 106. The feedback information selection section 109 measures channel quality based on the channel state reported from the channel estimation section 106, and selects CQIs to correspond to the PMIs. In this case, the feedback information selection section 109 can select CQIs for SU-MIMO transmission and MU-MIMO transmission. The feedback information selection section 109 reports the selected RIs, PMIs and CQIs to the feedback control signal generating section 111.

Based on the RIs, PMIs and CQIs reported, a feedback control signal generating section 111 generates control signals (for example, the PUCCH signal) to feed back these to the base station 20. In this case, the feedback control signal generating section 111 generates control signals in accordance with the formats of report 1 to report 3, depending on the values of the PTIs reported from the feedback information selection section 109. The feedback control signal generating section 111 performs channel coding and data modulation of the information of the PMIs, CQIs and RIs to feed back through the PUCCH. The control signals generated in the feedback control signal generating section 111 and the PMIs, CQIs and RIs after channel coding are output to a multiplexer (MUX: multiplexing section) 115.

When the user equipment 10 determines the codebook structure, the user equipment 10 reports codebook structure information (for example, the codebook size B (method 1), the bit arrangement of the codebook constituent parameters (method 2) and so on) to the base station eNB as a higher layer signal. Transmission data #k related to user #k and transmitted from a higher layer is subjected to channel coding by the channel coding section 112 and then subjected to data modulation in the data modulation section 113. Transmission data #k, having been subjected to data modulation in the data modulation section 113, is subjected to an inverse Fourier transform in a discrete Fourier transform section, which is not shown, and converted from a time sequence signal to a frequency domain signal, and output to a subcarrier mapping section, which is not shown.

In the subcarrier mapping section, transmission data #k is mapped to subcarriers in accordance with schedule information that is designated from the base station 20. At this time, the subcarrier mapping section maps (multiplexes) reference signal #k, having been generated in a reference signal generation section, which is not shown, to subcarriers, with transmission data #k. Transmission data #k, mapped to subcarriers in this way, is output to a precoding multiplication section 114.

The precoding multiplication section 114 applies a phase and/or amplitude shift to transmission data #k for each of receiving antennas 1 to NRX based on precoding weights corresponding to the PMIs. Transmission data #k, having been subjected to a phase and/or amplitude shift by the precoding multiplication section 114, is output to the multiplexer (MUX) 115.

The multiplexer (MUX) 115 combines transmission data #k, to which a phase and/or amplitude shift has been applied, and the control signals generated in the feedback control signal generating section 111, and generates transmission signals for each receiving antennas 1 to $N_{RX}$. The mapping (multiplexing) in this multiplexer (MUX) 115 multiplexes feedback information to correspond to report 1 to report 3 in accordance with the values of the PTIs, on varying subframes.

The transmission signals generated in the multiplexer (MUX) 115 are subjected to a discrete Fourier transform in discrete Fourier transform sections (DFT sections) 116 #1 to 116 #N and converted from time sequence signals to frequency domain signals. After that, an inverse fast Fourier transform is performed in inverse fast Fourier transform sections (IFFT sections) 117 #1 to 117 #N and the signals are converted from frequency domain signals to time domain signals, and, after that, have CPs attached thereto in CP adding sections 118 #1 to 118 #N, and output to RF transmitting circuits 119 #1 to 119 #N.

After a frequency conversion process into a radio frequency band is executed in RF transmitting circuits 119 #1 to 119 #N, the resulting signals are output to antenna 1 to antenna $N_{RX}$ via duplexers 101 #1 to 101 #N, and transmitted from antenna 1 to antenna $N_{RX}$ to the radio base station 20 on the uplink. Note that these RF transmitting circuits 119 #1 to 119 #N, duplexers 101 #1 to 101 #N and antenna 1 to antenna $N_{RX}$ constitute a transmission section to transmit these control signals.

In the base station 20 shown in FIG. 9, transmission data #1 to #k for users #1 to #k are input in channel coding sections 201 #1 to 201 #k.

Higher control signal generating sections 223 #1 to 223 #k generate higher control signals (for example, RRC signaling), which include information about the CSI (Channel State Information) feedback mode in the PUCCH/PUSCH, the feedback cycle and offset parameter in that feedback mode, and so on. Transmission data #1 to #k include higher control signals generated in higher control signal generating sections 223 #1 to 223 #k.

Transmission data #1 to #k and the higher control signals are subjected to channel coding in channel coding sections 201 #1 to 201 #k, and, after that, output to data modulation sections 202 #1 to 202 #k and subjected to data modulation. Transmission data #1 to #k and the higher control signals, having been subjected to data modulation in data modulation sections 202 #1 to 202 #k, are subjected to a discrete Fourier transform in a discrete Fourier transform section, which is not illustrated, and converted from time sequence signals into frequency domain signals, and output to precoding multiplication sections 203 #1 to 203 #k.

Based on the precoding weights provided from the precoding weight generating section 220, precoding multiplication sections 203 #1 to 203 #k apply a phase and/or amplitude shift to transmission data #1 to #k for each of antennas 1 to $N_{Tx}$ (weighting of antennas 1 to $N_{Tx}$ by means of precoding). Transmission data #1 to #k, to which a phase and/or amplitude shift has been applied in precoding multiplication sections 203 #1 to 203 #k, are output to a multiplexer (MUX) 205. For precoding for MU-MIMO transmission on the downlink, the precoding vector for each transmission layer is determined based on PMI information fed back from the user equipment 10 (which is bit information (p1, p2, p3 and gb) that is determined by feedback of phase information θ1, θ2 and θ3 and selection of gain information g).

The multiplexer (MUX) 205 generates transmission signals for each of transmitting antennas 1 to $N_{TX}$, with respect to transmission data #1 to #k, to which a phase and/or amplitude shift has been applied. The transmission signals generated in the multiplexer (MUX) 205 are subjected to a discrete Fourier transform in discrete Fourier transform sections (DFT sections) 206 #1 to 206 #k and converted from time sequence signals to frequency domain signals. After that, the signals are subjected to an inverse fast Fourier transform in inverse fast Fourier transform sections (IFFT sections) 207 #1 to 207 #k and converted from frequency domain signals to time domain signals, and, after that, has CPs attached thereto in CP adding section 208 #1 to 208 #k, and output to RF transmitting circuits 209 #1 to 209 #k.

In RF transmitting circuits 209 #1 to 209 #N, after a frequency conversion process for conversion into a radio frequency band is executed, the resulting signals are output to antenna 1 to antenna $N_{Tx}$ via duplexers 210 #1 to 210 #N, and transmitted from antenna 1 to antenna $N_{Tx}$ to the user equipment 10 on the downlink.

Transmission signals transmitted from the user equipment 10 on the uplink are received in antennas 1 to $N_{Tx}$, electrically separated into the transmitting route and the receiving route in duplexers 210 #1 to 210 #N, and, after that, output to RF receiving circuits 211 #1 to 211 #N. Then, in RF receiving circuits 211 #1 to 211 #N, after a frequency conversion process for conversion from radio frequency signals to baseband signals is executed, the resulting signals are output to a receiving time estimation section 221 and CP removing sections 212 #1 to 212 #N. In the receiving time estimation section 221, the receiving times are estimated with the received signals after the frequency conversion process, and these receiving times are output to CP removing sections 212 #1 to 212 #N.

The CPs are removed in CP removing sections 212 #1 to 212 #N, and the signals are subjected to a Fourier transform in fast Fourier transform sections (FFT sections) 213 #1 to 213 #N, and converted from time sequence signals to frequency domain signals. After that, an inverse discrete Fourier transform is performed in inverse discrete Fourier transform sections (IDFT sections) 214 #1 to 214 #N, and the signals are converted from frequency domain signals to time domain signals. The received signals having been converted into time domain signals are output to channel estimation sections 215 #1 to 215 #N and data channel signal demodulation sections 216 #1 to 216 #N.

Channel estimation sections 215 #1 to 215 #N estimate channel states from the reference signals included in the received signals output from IDFT sections 214 #1 to 214 #N, and report the estimated channel states to data channel signal demodulation sections 216 #1 to 216 #N. Channel estimation sections 215 #1 to 215 #N output the estimated channel states to feedback information demodulation sections 218 #1 to 218 #N. Data channel signal demodulation sections 216 #1 to 216 #N demodulate the data channel signals based on the reported channel states. The demodulated data channel signals are subjected to channel decoding in channel decoding sections 217 #1 to 217 #N and converted back to user #1 to #k signals.

With the present example, the codebook structure is adapted in the user equipment 10, so that information for codebook structure adaptation is reported to the base station eNB on the uplink, and the information for codebook structure adaptation is extracted from the signals having been subjected to channel decoding.

Feedback information demodulation sections 218 #1 to 218 #N demodulate channel-related information (channel information)—for example, feedback information such as CQIs, PMIs, RIs and PTIs reported through the PUCCH—from information included in each control channel signal (for example, the PUCCH). The information demodulated by feedback information demodulation sections 218 #1 to 218 #N is output to PMI information extraction sections 219 #1 to 219 #N and CQI information extraction sections 222 #1 to 222 #N.

PMI information extraction sections 219 #1 to 219 #N extract PMI information from the information demodulated by feedback information demodulation sections 218 #1 to 218 #N. In this case, PMI information extraction sections 219 #1 to 219 #N extract PMI information designated by report 2 and report 3 included in the PUCCH, based on the RI and PTI that were fed back last (most recently). Here, the PMI information matches bit information (p1, p2, p3 and $g_b$) that is determined by feedback of phase information θ1, θ2 and θ3 and selection of gain information g. That is, by means of the PMI information, the index selected from the joint codebook of the structured codebook and the intra-subvector phases (θ1, θ2) and the inter-subvector phase (θ3) selected from the phase codebook are specified. The extracted PMIs are output to the precoding weight generating section 220.

CQI information extraction sections 222 #1 to 222 #N extract CQI information from the information that is demodulated in feedback information demodulation sections 218 #1 to 218 #N. The extracted CQIs are output to channel coding sections 201 #1 to 201 #k and data modulation sections 202 #1 to 202 #k, and used to select the MCS for transmission data #1 to transmission data #k.

Based on the PMIs output from PMI information extraction sections 219 #1 to 219 #N and RIs, the precoding weight generating section 220 generate precoding weights to represent the amount of phase and/or amplitude shift for transmission data #1 to #k. The generated precoding weights are output to precoding multiplication sections 203 #1 to 203 #k, and are used in the precoding of transmission data #1 to transmission data #k.

As described above, the present embodiment defines a structured codebook with indices that indicate a gain vector and its permutation (the first parameter), intra-subvector phases (the second and third parameters), and an inter-subvector phase (the fourth parameter), so that it is possible to change the codebook structure in accordance with the bit arrangement of the first to fourth parameters. Then, by determining an adequate codebook structure and reporting bit data to represent the codebook size B (B1, B2 or B3) that matches the determined codebook structure, it is possible to change the structure of the structured codebook more adaptively. By determining an adequate codebook structure and reporting bit data to represent the bit arrangement of codebook constituent parameters ($g_b$, p1, p2 and p3) to match the determined codebook structure, it is possible to change the structure of the structured codebook more adaptively. By determining an adequate gain parameter "b" and reporting bit data to represent the determined gain parameter "b," it is possible to change the structure of the structured codebook more adaptively.

Although a configuration has been presented with the above description where the user equipment 10 determines a codebook structure and reports information for codebook structure adaptation to the base station 20, it is equally possible to generate control signals for codebook structure adaptation in the base station eNB and report these to the user equipment 10.

Figure 10:
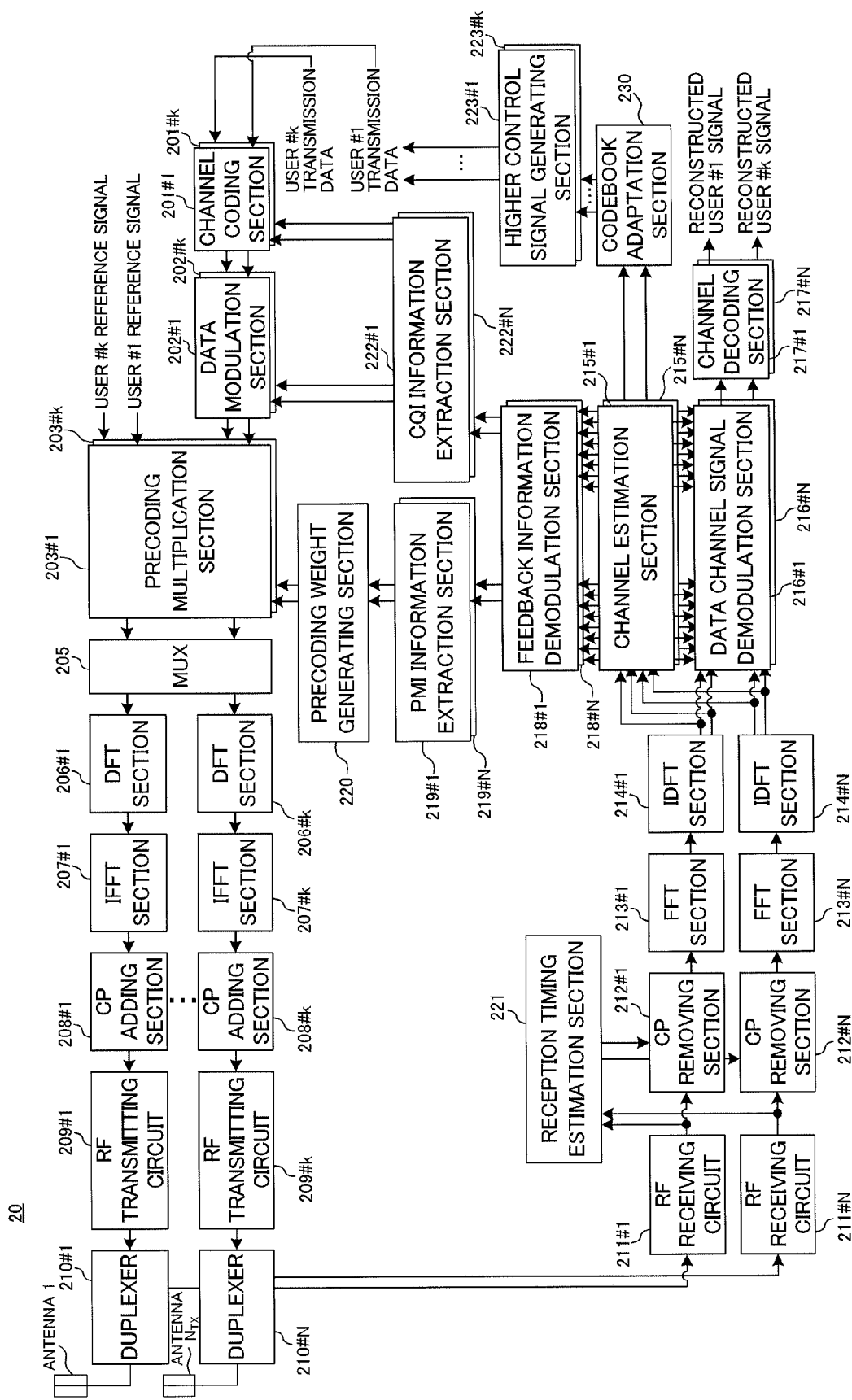
FIG. 10 is a block diagram to show a configuration of a base station according to a modified example.
Figure 11:
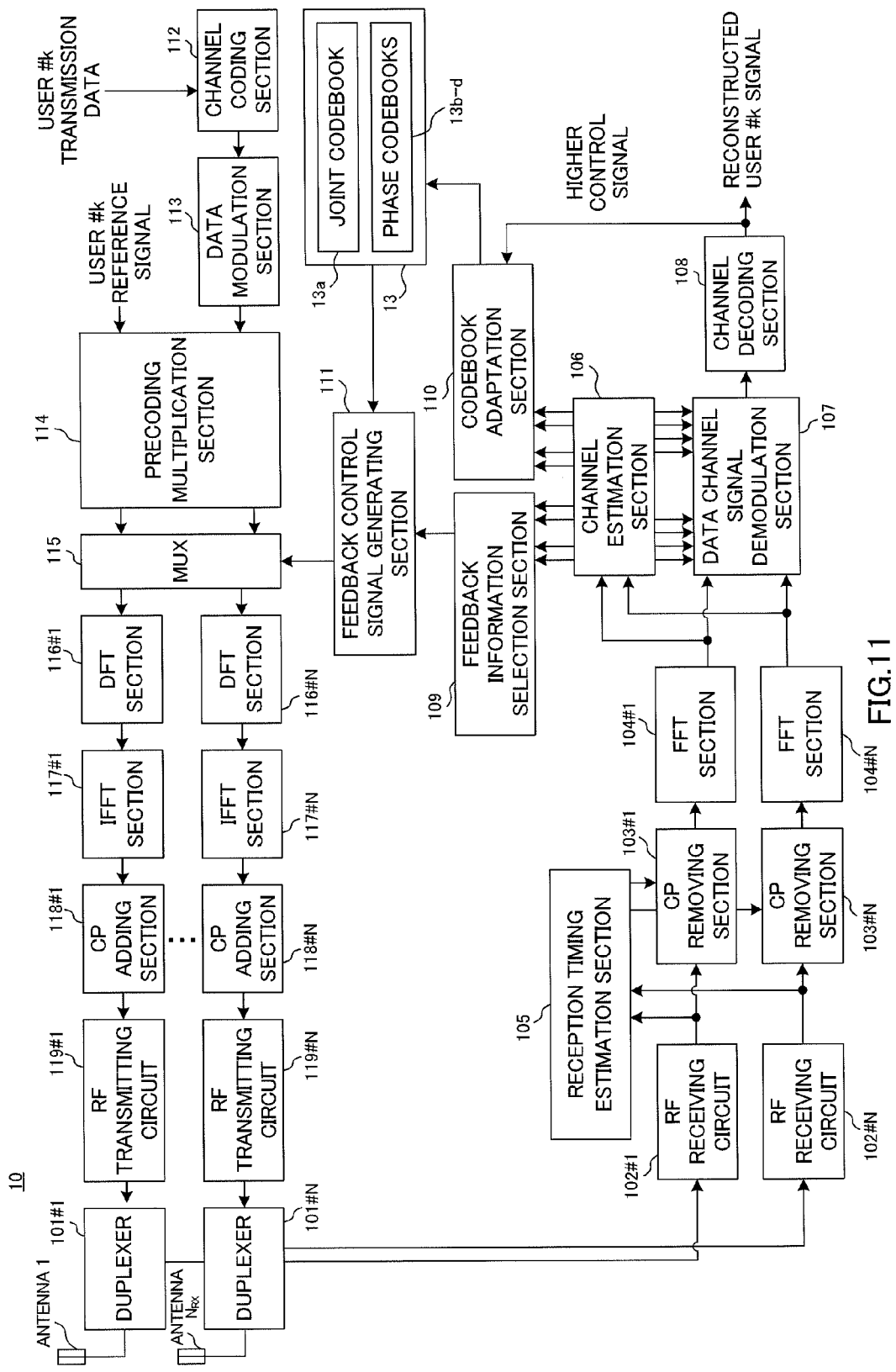
FIG. 11 is a block diagram to show a configuration of user equipment according to a modified example.

FIG. 10 is a block diagram illustrating a case where control signals for codebook structure adaptation are generated in the base station eNB, FIG. 11 is a block diagram of user equipment that receives control signals for codebook structure adaptation from the base station eNB and adapts the codebook structure. Note that parts that are the same between FIGS. 8 and 9 are assigned the same codes.

As shown in FIG. 10, the base station 20 has a codebook adaptation section 230 that determines an adequate codebook structure and adapts the codebook structure. The codebook adaptation section 230 may determine an adequate codebook structure (bit arrangement of codebook constituent parameters) or an adequate gain parameter "b" based on channel characteristics (as to whether the area is a local area or a wide area), antenna configuration (as to whether the antenna is an orthogonal polarization antenna or a non-orthogonal polarization antenna), channel estimation results and so on. The channel characteristic and antenna configuration are supplied from higher layers, and the channel estimation results are supplied from channel estimation sections 215 #1 to 215 #k.

When above method 1 is applied, the codebook adaptation section 230 determines an adequate codebook structure (bit arrangement of codebook constituent parameters) based on channel estimation results (and/or antenna configuration). Higher control signal generating sections 223 #1 to 223 #k generate bit data to represent a codebook size B (B1, B2 or B3) that matches the determined codebook structure, as a higher control signal for codebook structure adaptation.

When above method 2 is applied, the codebook adaptation section 230 determines an adequate codebook structure (bit arrangement of codebook constituent parameters). Higher control signal generating sections 223 #1 to 223 #k generate bit data to represent a codebook constituent parameter bit arrangement ($g_b$, p1, p2 and p3) to match determined codebook structure, as a higher control signal for codebook structure adaptation.

When above method 3 is applied, the codebook adaptation section 230 determines an adequate gain parameter "b." Higher control signal generating sections 223 #1 to 223 #k generate bit data to represent the determined gain parameter "b," as a higher control signal for codebook structure adaptation.

Higher control signal generating sections 223 #1 to 223 #k generate higher control signals for adaptation of the codebook structure in the user equipment 10 base on the adequate codebook structure determined by the codebook adaptation section 230. The higher control signals are signaled in the same way as with the above embodiment.

As shown in FIG. 11, in the user equipment 10, the codebook adaptation section 110 adapts the structure of the codebook 13 based on higher control signals. Based on the higher control signals decoded in the channel decoding section 108, the codebook adaptation section 110 is controlled.

Figure 12:
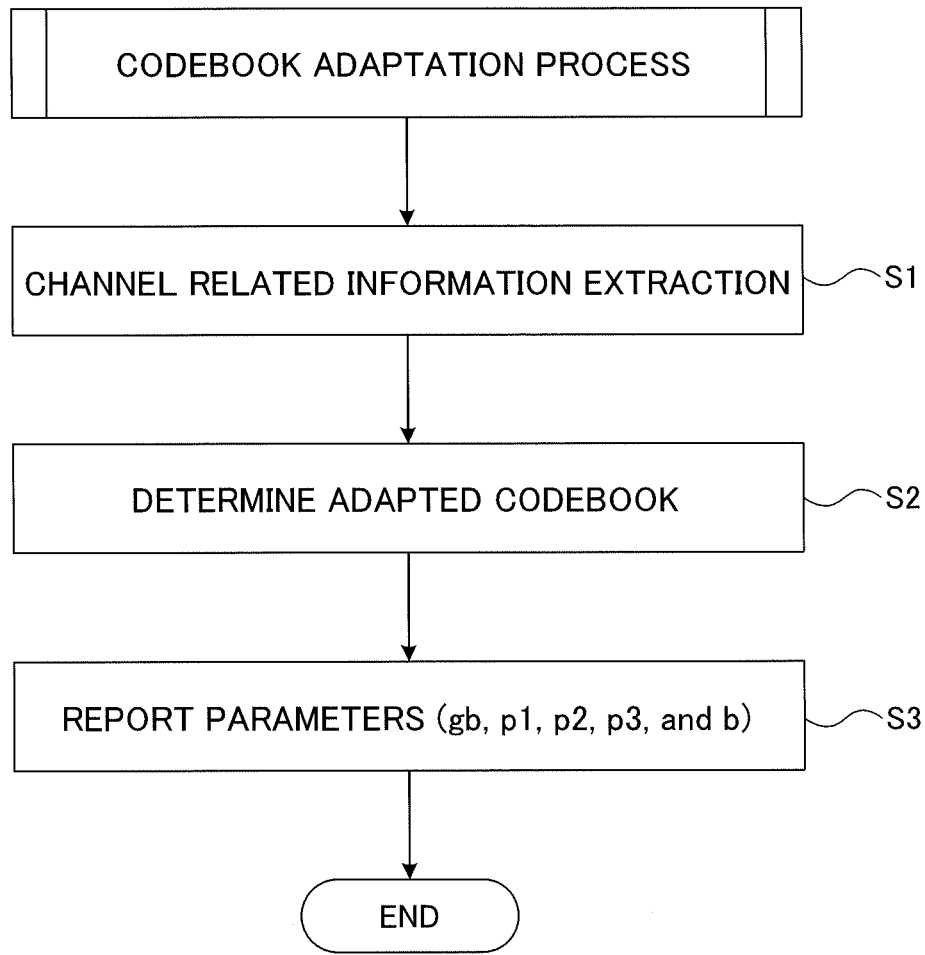
FIG. 12 is a diagram to show a flowchart of codebook adaptation according to an embodiment of the present invention.

FIG. 12 is a flowchart of codebook adaptation. After having received channel estimation results from channel estimation sections 215 #1 to 215 #k, the codebook adaptation section 230 extracts channel-related information (long-term statistical information) such as channel characteristics (as to whether the area is a local area or a wide area), antenna configuration (as to whether the antenna is an orthogonal polarization antenna or a non-orthogonal polarization antenna), and so on (step S1). Next, the codebook adaptation section 230 determines the codebook to adapt, based on the channel-related information extraction (step S2). The higher control signal generating section 223 transmits the parameters of the adapted codebook ($g_b$, p1, p2, p3 and b) to the user equipment 10 as a higher layer control signal (step S3). Note that, as for the method of reporting the adapted codebook parameters ($g_b$, p1, p2 and p3), either the method of reporting the parameters of the adapted codebook by reporting the codebook size B (method 1), or the method of making a plurality of patterns of codebook parameters bitmaps and reporting the parameters of the adapted codebook by reporting the bitmaps (method 2).

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2012-106001, filed on May 7, 2012, including the specifications, drawings, and abstracts, are incorporated herein by reference in its entirety.

The invention claimed is:

1. A codebook adaptation method to adapt a codebook for precoding applied to downlink MIMO transmission, the method comprising the steps of:
   reporting a codebook size of the codebook, defined with a plurality of parameters pertaining to gain information and phase information, from one communication apparatus to another communication apparatus; and
   at the another communication apparatus, adapting a codebook structure by changing a bit arrangement of the parameters defining the codebook, based on the codebook size reported from the one communication apparatus.

2. The codebook adaptation method according to claim 1, wherein the one communication apparatus determines the codebook size such that the codebook structure adapts to at least one of channel characteristics and antenna configuration.

3. The codebook adaptation method according to claim 2, wherein a table in which the bit arrangement of the plurality of parameters is defined in association with each codebook size is shared in advance between the communication apparatuses.

4. The codebook adaptation method according to claim 1, wherein:
   as a parameter pertaining to the gain information of the codebook, an index to represent a combination of a gain vector, the gain vector being formed with a plurality of elements having amplitude components, and a permutation of each element of the gain vector, is defined; and
   as parameters pertaining to the phase information of the codebook, where the gain vector is defined with a plurality of subvectors, an intra-subvector phase to represent a relative phase between elements in each subvector, and an inter-subvector phase to represent a relative phase between the subvectors, are defined.

5. The codebook adaptation method according to claim 1, further comprising the steps of:
   as a parameter pertaining to the gain information of the codebook, defining an index to represent a combination of a gain vector, the gain vector being formed with a plurality of elements having amplitude components, and a permutation of each element of the gain vector;
   as parameters pertaining to the phase information of the codebook, where the gain vector is defined with a plurality of subvectors, defining an intra-subvector phase to represent a relative phase between elements in each subvector, and an inter-subvector phase to represent a relative phase between the subvectors;
   forming the gain vector with a plurality of elements having a first amplitude component, and a plurality of elements having a second amplitude component that is "b" times bigger than the first amplitude component, as the plurality of elements having amplitude components; and
   reporting a value of "b" from the one communication apparatus to the another communication apparatus.

6. A codebook adaptation method to adapt a codebook that is used in precoding applied to downlink MIMO transmission, the method comprising the steps of:
   reporting a bit arrangement of a plurality of parameters pertaining to gain information and phase information defining a codebook structure, from one communication apparatus to another communication apparatus; and
   at the another communication apparatus, adapting a codebook structure by changing a bit arrangement of the parameters defining the codebook, based on the bit arrangement of the plurality of parameters reported from the one communication apparatus.

7. A user equipment to receive a signal to which codebook-based precoding is applied in downlink MIMO transmission, the user equipment comprising:
   a receiving circuit that receives a signal to represent a codebook size of a codebook, defined with a plurality of parameters pertaining to gain information and phase information; and
   a processor configured to adapt a codebook structure by changing a bit arrangement of the parameters defining the codebook, based on the codebook size represented by the received signal.

8. A radio communication system to apply codebook-based precoding to downlink MIMO transmission between a first communication apparatus and a second communication apparatus, wherein:
   the first communication apparatus reports a codebook size of a codebook, defined with a plurality of parameters pertaining to gain information and phase information, to the second communication apparatus; and
   the second communication apparatus adapts a codebook structure by changing a bit arrangement of the parameters defining the codebook, based on the codebook size reported from the first communication apparatus.

9. A radio communication system to apply codebook-based precoding to downlink MIMO transmission between a first communication apparatus and a second communication apparatus, wherein:
   the first communication apparatus reports a bit arrangement of a plurality of parameters pertaining to gain information and phase information defining a codebook structure, to the second communication apparatus; and
   the second communication apparatus adapts the codebook structure by changing a bit arrangement of the parameters defining the codebook structure, based on the bit arrangement of the plurality of parameters reported from the first communication apparatus.

* * * * *